United States Patent
Acar et al.

(10) Patent No.: US 7,071,282 B2
(45) Date of Patent: Jul. 4, 2006

(54) BENZIMIDAZOLE DIAMINE-BASED POLYETHERIMIDE COMPOSITIONS AND METHODS FOR MAKING THEM

(75) Inventors: Havva Acar, Clifton Park, NY (US); Daniel Joseph Brunelle, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 107 days.

(21) Appl. No.: 10/454,006

(22) Filed: Jun. 3, 2003

(65) Prior Publication Data

US 2004/0249117 A1  Dec. 9, 2004

(51) Int. Cl.
  *C08G 73/10*  (2006.01)
  *C08G 69/28*  (2006.01)
  *C08L 77/00*  (2006.01)

(52) U.S. Cl. ............ 528/170; 528/125; 528/126; 528/128; 528/172; 528/173; 528/174; 528/176; 528/179; 528/183; 528/185; 528/188; 528/220; 528/228; 528/229; 528/350; 528/351; 528/353; 525/420; 525/422; 525/432

(58) Field of Classification Search ........ 528/170, 528/125, 126, 128, 172–174, 176, 179, 183; 528/185, 188, 220, 228, 229, 350, 351, 353; 428/353, 473.5, 458; 525/420, 422, 432; 524/600, 602

See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,247,165 A | 4/1966 | Rodia | |
| 3,271,367 A | 9/1966 | Schnell et al. | |
| 3,271,368 A | 9/1966 | Goldberg et al. | |
| 4,603,194 A | 7/1986 | Mendiratta et al. | |
| 4,973,630 A * | 11/1990 | Leung et al. .......... | 525/432 |
| 5,277,981 A * | 1/1994 | Haider et al. ......... | 428/408 |
| 5,290,909 A * | 3/1994 | Chen et al. .......... | 528/353 |
| 5,872,294 A | 2/1999 | Caringi et al. | |
| 6,235,934 B1 | 5/2001 | Caringi et al. | |
| 6,333,391 B1 * | 12/2001 | Laycock et al. ........ | 528/170 |
| 6,355,357 B1 * | 3/2002 | Takahashi et al. ...... | 428/473.5 |
| 6,489,436 B1 * | 12/2002 | Lin et al. ............ | 528/353 |
| 6,753,365 B1 * | 6/2004 | Brown et al. .......... | 524/123 |
| 6,770,733 B1 * | 8/2004 | Zuo et al. ............ | 528/353 |
| 2003/0171469 A1 * | 9/2003 | Brown et al. .......... | 524/284 |

FOREIGN PATENT DOCUMENTS

| | | |
|---|---|---|
| EP | 1 229 081 | 7/2002 |
| EP | 1 348 728 | 1/2003 |

OTHER PUBLICATIONS

Anonymous, "Caustic Etchable Polyimide Films Containing 2-(4-aminophenyl)-5-Aminobenzimidazole as a Monomer Component", Research Disclosure, Kenneth Mason Publications, vol. 409, No. 39, May 1998.
Chen et al., "Curl-Free High-Adhesion Polyimide/Copper Laminate", Journal of Applied Polymer Science, vol. 51, No. 9, pp. 1647-1652, Feb. 1994.
PCT Search Report dated Sep. 24, 2004.
HL Chen et al., Journal of Applied Polymer Science, "*Curl-Free High-Adhesion Polyimide/Copper Laminate*", vol. 51, pp. 1647-1652, 1994.

* cited by examiner

*Primary Examiner*—P. Hampton Hightower
(74) *Attorney, Agent, or Firm*—Andrew J. Caruso; William E. Powell, III

(57) ABSTRACT

Disclosed herein are polyetherimide compositions comprising structural units of the formula:

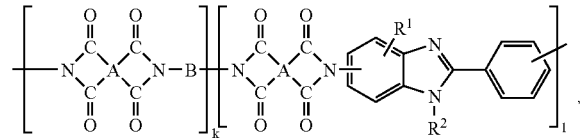

derived from at least one benzimidazole diamine, wherein $R^1$ and $R^2$ are independently selected from hydrogen and $C_1$–$C_6$ alkyl groups; "A" comprises structural units of the formulae:

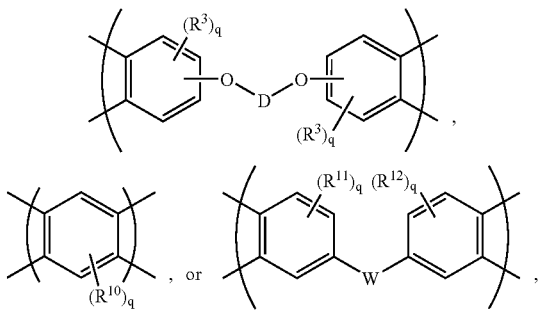

or mixtures of the foregoing structural units; wherein "D" is a divalent aromatic group, $R^3$ and $R^{10}$–$R^{12}$ are independently selected from hydrogen, halogen, and $C_1$–$C_6$ alkyl groups; "q" is an integer having a value of 1 up to the number of positions available on the aromatic ring for substitution; and "W" is a linking group; and "B" comprises substituted and unsubstituted arylene groups having from about 6 to about 25 carbon atoms. Methods for producing the polyetherimide compositions are also disclosed herein.

62 Claims, No Drawings

BENZIMIDAZOLE DIAMINE-BASED POLYETHERIMIDE COMPOSITIONS AND METHODS FOR MAKING THEM

BACKGROUND

The invention relates generally to benzimidazole diamine-based polyetherimide compositions and methods for making them.

Polyimides are high-performance materials that are suitable for applications requiring chemical and thermal resistance, and good mechanical and electrical properties. However, fully aromatic polyimides are generally difficult to process due to high softening temperatures and/or solubility. Various approaches have been taken to improve processibility, but they often result in polyimides that suffer in thermal properties. ULTEM, a polyetherimide manufactured by General Electric Company has a good balance of processibility and thermal properties. Commercial grades of ULTEM have glass transition temperatures in the range from about 210° C. to about 225° C., are stable up to about 450° C., and can be processed by injection molding or extrusion. Furthermore, ULTEM polyetherimides have good dimensional stability, mechanical strength, electrical properties, inherent flame resistance, and chemical resistance.

2-(p-Aminophenyl)-5(6)-aminobenzimidazole (also sometimes abbreviated as "ABIZ") has been used for making polyimides by reaction with 3,4,3',4'-benzophenone tetracarboxylic anhydride. Copolymers of ABIZ and oxydianiline with biphenyl tetracarboxylic dianhydride (also referred to sometimes as "BPDA") have also been prepared for achieving high-adhesion polyimides for curl-free copper laminates.

It would be desirable to develop improved polyetherimide compositions that can be used to extend the range of applications over those currently in use. The expanded application areas require the polyetherimides to have higher glass transition temperatures, preferably without losing chemical resistance, thermal properties, and mechanical properties. Such materials are expected to find enhanced utility in the food storage, airplanes, and microelectronics areas.

BRIEF DESCRIPTION

Briefly, one embodiment of the present invention is a polyetherimide composition comprising structural units of the formula (I):

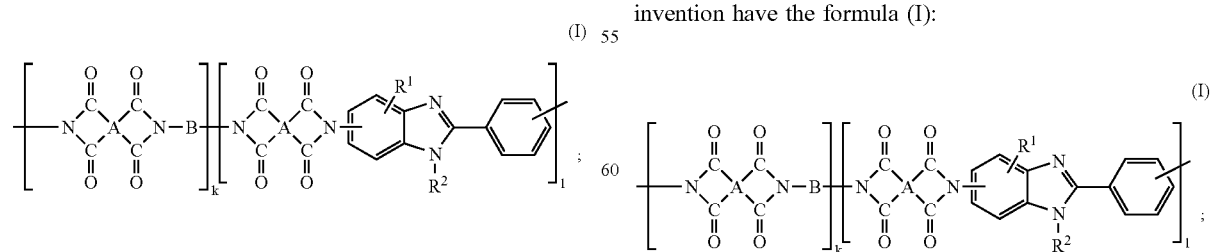

derived from at least one benzimidazole diamine, wherein $R^1$ and $R^2$ are independently selected from hydrogen and $C_1$–$C_6$ alkyl groups. In the formula, "A" comprises structural units of the formulae:

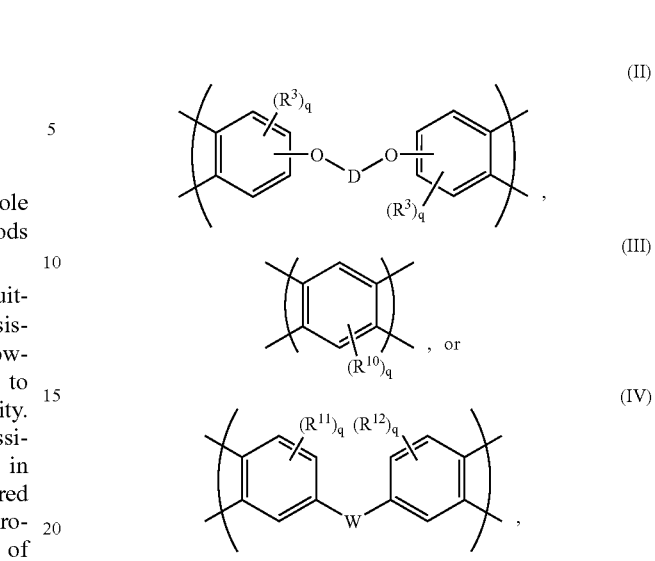

or mixtures of the foregoing structural units; wherein "D" is a divalent aromatic group, $R^3$ and $R^{10}$—$R^{12}$ are independently selected from hydrogen, halogen, and $C_1$–$C_6$ alkyl groups; "q" is an integer having a value of 1 up to the number of positions available on the aromatic ring for substitution; "W" is a linking group; and "B" comprises substituted and unsubstituted arylene groups having from about 6 to about 25 carbon atoms.

Another embodiment of the invention is a method of producing a polyetherimide composition. The method comprises: reacting a dianhydride composition with a first diamine composition comprising a benzimidazole diamine and a second diamine in a solvent to form a poly(amic acid), and imidizing the poly(amic acid) to form the polyetherimide composition, where the polyetherimide composition comprises structural units of the formula (I) as described above.

Various other features, aspects, and advantages of the present invention will become more apparent with reference to the following description and appended claims.

DETAILED DESCRIPTION

The embodiments of the present invention have many advantages, including the production of polyetherimide compositions that have higher glass transition temperatures to expand the areas in which the polyetherimides can be applied.

The structural units comprising the polyetherimides of the invention have the formula (I):

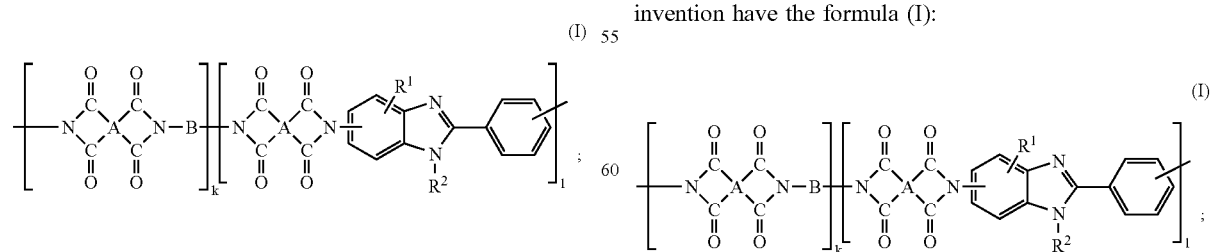

where "A" comprises structural units of the formulae (II), (III), or (IV):

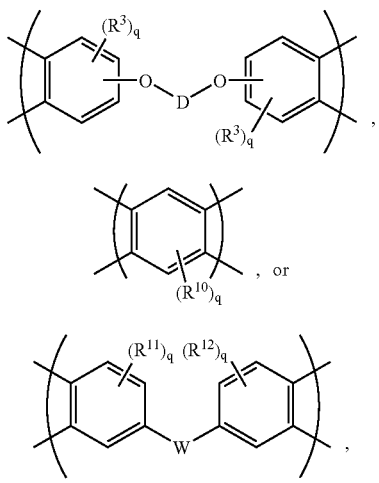

wherein "D" is a divalent aromatic group, $R^3$ and $R^{10}$–$R^{12}$ are independently selected from hydrogen, halogen, and $C_1$–$C_6$ alkyl groups; "q" is an integer having a value of 1 up to the number of positions available on the aromatic ring for substitution; and "W" is a linking group selected from the group consisting of a covalent bond, C=O, $SO_2$, O, S, and $C(CF_3)_2$. "B" comprises substituted and unsubstituted arylene groups having from about 6 to about 25 carbon atoms. Various structural possibilities for the polyetherimides can be arrived at depending upon the values taken by "k", "l"; the nature of "D", "B", "W", and the groups $R^1$–$R^3$. In one embodiment, "k" and "l" are integers independently having values from 1 to about 50. In another embodiment, "k" and "l" are integers independently having values greater than 1. The polyetherimides are random copolymers in one embodiment, and block copolymers in another embodiment. In a particular embodiment, the formula (I) comprises structural units derived from 2-(4-aminophenyl)-5(6)-aminobenzimidazole. Furthermore, the polyetherimide of formula (I) may optionally comprise end groups derived from at least one mono-amine or mono-anhydride chain stopper.

In the formula (II), "D" is a divalent aromatic group derived from a dihydroxy substituted aromatic hydrocarbon, and has the general formula (V):

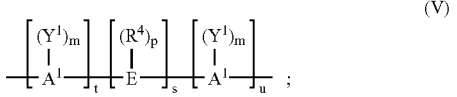

where "$A^1$" represents an aromatic group including, but not limited to, phenylene, biphenylene, naphthylene, etc. In some embodiments, "E" may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments, when "E" is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments, "E" may be a cycloaliphatic group non-limiting examples of which include cyclopentylidene, cyclohexylidene, 3,3,5-trimethylcyclohexylidene, methylcyclohexylidene, bicyclo[2.2.1]hept-2-ylidene, 1,7,7-trimethylbicyclo[2.2.1]hept-2-ylidene, isopropylidene, neopentylidene, cyclopentadecylidene, cyclododecylidene, and adamantylidene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^4$ represents hydrogen or a monovalent hydrocarbon group including, but not limited to, alkenyl, allyl, alkyl, aryl, aralkyl, alkaryl, or cycloalkyl. In various embodiments a monovalent hydrocarbon group of $R^4$ may be halogen-substituted, particularly fluoro- or chloro-substituted, for example as in dihaloalkylidene group of formula $C=CZ_2$, wherein each Z is hydrogen, chlorine, or bromine, subject to the provision that at least one Z is chlorine or bromine; and mixtures of the foregoing moieties. In a particular embodiment, the dihaloalkylidene group is a dichloroalkylidene, particularly gem-dichloroalkylidene group. $Y^1$ may be hydrogen; an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^5$ wherein $R^5$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" represents an integer equal to either zero or one; and "u" represents any integer including zero.

In dihydroxy-substituted aromatic hydrocarbons in which "D" is represented by formula (V) above, when more than one $Y^1$ substituent is present, they may be the same or different. The same holds true for the $R^1$ substituent. Where "s" is zero in formula (V) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons, "E" may be an unsaturated alkylidene group.

Suitable dihydroxy-substituted aromatic hydrocarbons of this type include those of the formula (VI):

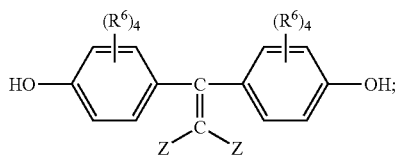

(VI)

where each $R^6$ is independently hydrogen, chlorine, bromine, or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (VII):

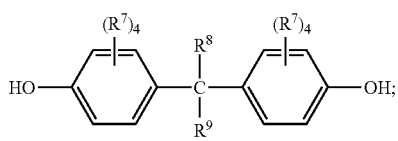

(VII)

where each $R^7$ is independently hydrogen, chlorine, bromine, or a $C_{1-30}$ monovalent hydrocarbon or hydrocarbonoxy group, and $R^8$ and $R^9$ are independently hydrogen or a $C_{1-30}$ hydrocarbon group.

In embodiments of the present invention, dihydroxy-substituted aromatic hydrocarbons that may be used include those disclosed by name or formula (generic or specific)-in U.S. Pat. Nos. 2,991,273, 2,999,835, 3,028,365, 3,148,172, 3,271,367, and 3,271,368. In some embodiments of the invention, dihydroxy-substituted aromatic hydrocarbons include bis(4-hydroxyphenyl)sulfide, 1,4-dihydroxybenzene, 4,4'-oxydiphenol, 2,2-bis(4-hydroxyphenyl)hexafluoropropane, and mixtures of the foregoing dihydroxy-substituted aromatic hydrocarbons. In other embodiments, dihydroxy-substituted aromatic hydrocarbons that may be used include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4-dihydroxydiphenylmethane; bis(2-hydroxyphenyl) methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl) propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl) cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulfide; 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when "E" is an alkylene or alkylidene group, it may be part of one or more fused rings attached to one or more aromatic groups bearing one hydroxy substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols, illustrative examples of which include 2,2,2',2'-tetrahydro-3,3,3',3'-tetramethyl-1,1'-spirobi[1H-indene]-6,6'-diol (sometimes known as "SBI"). Mixtures comprising any of the foregoing dihydroxy-substituted aromatic hydrocarbons may also be employed.

Unless otherwise specified, the term "alkyl" as used in the various embodiments of the present invention is intended to designate both normal alkyl, branched alkyl, aralkyl, cycloalkyl, and bicycloalkyl groups containing from 1 to about 30 carbon atoms. In various embodiments normal and branched alkyl groups include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In some embodiments cycloalkyl groups are those containing from 3 to about 12 ring carbon atoms. Some illustrative non-limiting examples of these cycloalkyl groups include cyclobutyl, cyclopentyl, cyclohexyl, methylcyclohexyl, and cycloheptyl. In some embodiments aralkyl groups are those containing from 7 to about 14 carbon atoms; these include, but are not limited to, benzyl, phenylbutyl, phenylpropyl, and phenylethyl. Aryl groups used in the various embodiments of the present invention comprise those containing from 6 to 18 ring carbon atoms. Some illustrative non-limiting examples of these aryl groups include phenyl, biphenyl, and naphthyl.

In a particular embodiment, "D" represents a divalent aromatic group of the formula (VIII):

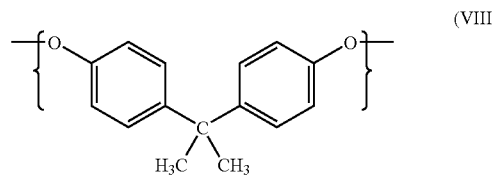

(VIII)

derived from bisphenol A. Bisphenol A is a versatile aromatic dihydroxy compound due to its large-scale availability and low cost. A number of chemical producers, such as General Electric Company, Dow Chemical Company, and Bayer manufacture bisphenol A for a variety of end-use applications, particularly for the polymer industry.

The structural units of formula (II) are generally obtained by the reaction of a suitable dihydroxy aromatic compound with a phthalic anhydride derivative substituted with a suitable leaving group. Examples of phthalic anhydride derivatives include the halophthalic anhydrides, such as 4-chlorophthalic anhydride, 3-chlorophthalic anhydride, or mixtures thereof; 4-nitrophthalic anhydride, 3-nitrophthalic anhydride, or mixtures thereof; 4-bromophthalic anhydride, 3-bromophthalic anhydride, or mixtures thereof; and the like. In one embodiment, the polyetherimide composition of the invention comprises "A" selected from the group consisting of formulae (IX)–(XI):

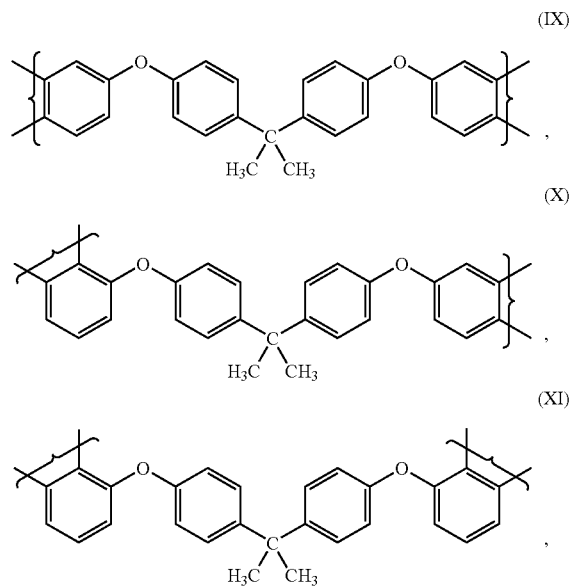

and mixtures thereof. Structural units of formulae (IX)–(XI) are derived from the dianhydrides 2,2-bis[4-(3,4-dicarboxyphenoxy)phenyl]propane dianhydride, the mixed dianhydride 2-[4-(3,4-dicarboxyphenoxy)phenyl]-2-[4-(2,3-dicarboxyphenoxy)phenyl]propane dianhydride, and 2,2-bis[4-(2,3-dicarboxyphenoxy)phenyl]propane dianhydride, respectively. Any mixture of the foregoing dianhydrides can also be used. In one particular embodiment a dianhydride composition comprising at least about 90 mole % 2,2-bis[4-(3,4-dicarboxyphenoxy)phenyl]propane dianhydride is employed in the synthesis of the polyetherimide composition. In another particular embodiment a dianhydride composition comprising at least about 95 mole % 2,2-bis[4-(3,4-dicarboxyphenoxy)phenyl]propane dianhydride is employed in the synthesis of the polyetherimide composition, and sometimes hereinafter this particular dianhydride composition is referred to as "BPADA". These dianhydrides may be obtained from the reaction of bisphenol A with a suitable phthalic anhydride derivative, such as for example, 4-chlorophthalic anhydride, 3-chlorophthalic anhydride, or mixtures thereof. The structural units of formulae (III) and (IV), as described previously, are derived from dianhydrides chosen from those known in the art suitable for making polyimides or polyetherimides, non-limiting examples of which include 3,4,3',4'-benzophenonetetracarboxylic acid dianhydride, 3,3',4,4'-oxydiphthalic anhydride, 2,3,2',3'-biphenyltetracarboxylic acid dianhydride, pyromellitic dianhydride, 3,4,3',4'-diphenylsulfonetetracarboxylic acid dianhydride, 4,4'-bis(3,4-dicarboxyphenoxy)diphenyl sulfide dianhydride, 1,4-bis(3,4-dicarboxyphenoxy)benzene dianhydride, 4,4'-bis(3,4-dicarboxyphenoxy)diphenyl ether dianhydride, 2,2-bis(3,4-dicarboxyphenyl)hexafluoropropane dianhydride, and mixtures of the foregoing dianhydrides. In various embodiments, the polyetherimides comprise structural units derived from at least two dianhydrides described hereinabove. When at least two dianhydrides are selected, the relative amount of any two can be varied over a wide range, for example from a mole ratio of about 1:9 to about 9:1 in one embodiment, and from about 3:7 to about 7:3 in another embodiment.

The diamines forming the structural units "B" can be of a wide structural variety. In general, substituted or unsubstituted arylene diamines are of the formula $B(NH_2)_2$; where "B" comprises a divalent organic group selected from aromatic hydrocarbon groups having from 6 to about 22 carbon atoms and substituted derivatives thereof. In various embodiments, the aromatic hydrocarbon groups may be monocyclic, polycyclic, or fused.

In still other embodiments "B" comprises divalent aromatic hydrocarbon groups of the general formula (XII):

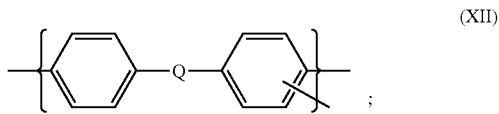

where the unassigned positional isomer about the aromatic ring is either meta or para to Q, and Q is a covalent bond or a member selected from the group consisting of formulae (XIII):

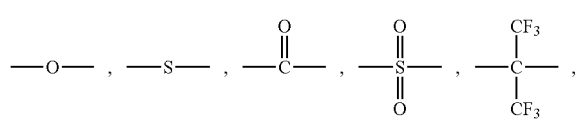

and an alkylene or alkylidene group of the formula $C_yH_{2y}$, wherein "y" is an integer from 1 to 5 inclusive. In some particular embodiments, "y" has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (XII) is para to Q.

In various embodiments the two amino groups in diamine-derived aromatic hydrocarbon groups are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon groups include phenyl, biphenyl, naphthyl, bis(phenyl) methane, 2,2-bis(phenyl)propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic hydrocarbon groups, when present, are at least one of chloro, methyl, ethyl or mixtures thereof. In other particular embodiments said aromatic hydrocarbon groups are unsubstituted.

In some particular embodiments, diamines from which "B" may be derived include, but are not limited to, meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, 2,6-bis(mercaptomethyl)-4-methyl-1,3-phenylenediamine, 4,6-bis(mercaptomethyl)-2-methyl-1,3-phenylene diamine, bis(2-chloro-4-amino-3,5-diethylphenyl)methane, 4,4'-oxydianiline, 3,4'-oxydianiline, 3,3'-oxydianiline, 1,2-bis(4-aminoanilino)cyclobutene-3,4-dione, 1,3-bis(3-aminophenoxy)benzene, 1,3-bis(4-aminophenoxy)benzene, 1,4-bis(4-aminophenoxybenzene), 3,3'-diaminodiphenylsulfone, 4,4'-diaminodiphenylsulfone, bis(4-(4-aminophenoxy)phenyl)sulfone, bis(4-(3-aminophenoxy)phenyl)sulfone, 4,4'-bis(3-aminophenoxy)biphenyl, 4,4'-bis(4-aminophenoxy)biphenyl, 2,2'-bis(4-(4-aminophenoxy)phenyl)propane, 2,2-bis[4-(4-aminophenoxy)phenyl] hexafluoropropane, 4,4'-bis(aminophenyl)hexafluoropropane, 3,3'-diaminobenzophenone, 4,4'-diaminodiphenylmethane, 4,4'-diaminodiphenyl ether, 3,3'-diaminodiphenylmethane, benzidine, 3,3'-dimethylbenzidine, 3,3'-dimethoxybenzidine, 4,4'-diaminodiphenylsulfide, and 2,2'-bis(4-aminophenyl) propane. Mixtures of the foregoing diamines can also be used. For example, the ETHACURE diamines, such as ETHACURE 100, which is a 80:20 weight ratio combination of 2,6-diethyl-4-methyl-1,3-phenylene diamine and 4,6-diethyl-2-methyl-1,3-phenylene diamine, respectively; and ETHACURE 300 which is a 80:20 weight ratio combination of 2,6-bis(mercaptomethyl)-4-methyl-1,3-phenylenediamine and 4,6-bis(mercaptomethyl)-2-methyl-1,3-phenylene diamine, respectively, can also be used. Diamines such as meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, and 2,6-diaminotoluene are particularly preferable since they are readily available commercially. In an embodiment, the "B" groups comprising the polyetherimide of the invention are derived from arylene diamines of formula $B(NH_2)_2$ and the benzimidazole diamines taken in a mole ratio range of between about 1:10 to about 10:1.

In another embodiment, the polyetherimide composition comprises structural units of the formula (I) derived from at least one benzimidazole diamine of the formula (XIV):

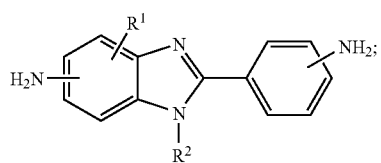

(XIV)

where $R^1$ and $R^2$ are as described previously. In this particular embodiment, in formula (I), "A" comprises structural units of the formulae (IX), (X), (XI), (II), (III), (IV) or mixtures of the foregoing structural units; and "B" comprises substituted and unsubstituted arylene groups having from about 6 to about 25 carbon atoms. In one embodiment, "k" and "l" are integers independently having values from 1 to about 50. In another embodiment, "k" and "l" are integers independently having values greater than 1. The polyetherimides are random copolymers in one embodiment, and block copolymers in another embodiment. In particular embodiments "B" may be an arylene group derived from at least one second diamine selected from the group consisting of 1,3-phenylene diamine, 1,4-phenylene diamine, 2,6-diethyl-4-methyl-1,3-phenylene diamine, 4,6-diethyl-2-methyl-1,3-phenylene diamine, 4-methyl-1,3-phenylene diamine, methylene bis(2-chloro-3,5-diethyl-4-phenylene) diamine, 2-methyl-1,3-phenylene diamine, 4,4'-oxydianiline, 3,4'-oxydianiline, 3,3'-oxydianiline, 4,4'-diaminodiphenylsulfone, 3,3'-diaminodiphenylsulfone, and mixtures of the foregoing diamines. In a particular embodiment, the polyetherimides of the invention comprise structural units represented by the formula (I), derived from 2-(4-aminophenyl)-5(6)-aminobenzimidazole. The mole ratio of the second diamine and 2-(4-aminophenyl)-5(6)-aminobenzimidazole is in a range of between about 10:1 to about 1:10. Furthermore, the polyetherimides may comprise structural units derived from at least two dianhydrides, as described previously. When at least two dianhydrides are selected, the mole ratio of any two dianhydrides can be varied over a wide range, as previously described. Furthermore, the polyetherimide of formula (I) may optionally comprise end groups derived from at least one mono-amine or mono-anhydride chain stopper.

In another particular embodiment, the polyetherimide composition consists essentially of structural units of the formula (I) derived from 2-(4-aminophenyl)-5(6)-aminobenzimidazole; where "A" consist essentially of structural units of the formulae (IX), (X), (XI), (II), (III), or (IV), or mixtures of the foregoing structural units; and "B" is an arylene group derived from at least one second diamine selected from the group consisting of 1,3-phenylene diamine, 1,4-phenylene diamine, 2,6-diethyl-4-methyl-1,3-phenylene diamine, 4,6-diethyl-2-methyl-1,3-phenylene diamine, 4-methyl-1,3-phenylene diamine, methylene bis(2-chloro-3,5-diethyl-4-phenylene) diamine, 2-methyl-1,3-phenylene diamine, 4,4'-oxydianiline, 3,4'-oxydianiline, 3,3'-oxydianiline, 4,4'-diaminodiphenylsulfone, 3,3'-diaminodiphenylsulfone, and mixtures of the foregoing diamines. In one embodiment, "k" and "l" are integers independently having values from 1 to about 50. In another embodiment, "k" and "l" are integers independently having values greater than 1. The polyetherimides are random copolymers in one embodiment, and block copolymers in another embodiment. Furthermore, the polyetherimide of formula (I) may optionally comprise end groups derived from at least one mono-amine or mono-anhydride chain stopper.

The polyetherimide compositions of the invention may be prepared by reacting a dianhydride composition with a first diamine composition comprising a benzimidazole diamine of the formula (XIV), and a second diamine in a suitable solvent. In one embodiment, the first diamine composition comprises 2-(4-aminophenyl)-5(6)-aminobenzimidazole, which is available commercially. The reaction can be carried out by employing a wide range of mole ratios of the first and the second diamine. In an embodiment, the mole ratio of the second diamine to the first diamine comprising a benzimidazole diamine is in a range of between about 1:10 to about 10:1. The initial product of the reaction generally is a poly(amic acid). The reaction is optionally run in the presence of a chain stopper, which may be added all at once or in portions at any suitable time. In one embodiment, the chain stopper is added with the diamine and the dianhydride charge. In another embodiment, the chain stopper is added after formation of the poly(amic acid). After addition of the chain stopper to the reaction mixture, the resulting mixture is then imidized, whereby the poly(amic acid) undergoes cyclization with loss of water to form the polyetherimide.

A wide variety of dianhydride compositions can be employed for producing the polyetherimides of the invention. Dianhydrides leading to structural units that satisfy formula (II) may be selected from the group consisting of 2,2-bis[4-(3,4-dicarboxyphenoxy)phenyl]propane dianhydride; 2,2-bis[4-(2,3-dicarboxyphenoxy)phenyl]propane dianhydride; the mixed dianhydride 2-[4-(3,4-dicarboxyphenoxy)phenyl]-2-[4-(2,3-dicarboxyphenoxy)phenyl] propane dianhydride; and mixtures of the foregoing dianhydrides, and in some embodiments these are preferred raw materials for producing the polyetherimides. Other dianhydrides which may be employed may be selected from the group consisting of 3,4,3',4'-benzophenonetetracarboxylic acid dianhydride, 3,3',4,4'-oxydiphthalic anhydride, 2,3,2', 3'-biphenyltetracarboxylic acid dianhydride, 3,4,3',4'-diphenylsulfonetetracarboxylic acid dianhydride, 4,4'-bis(3,4-dicarboxyphenoxy)diphenyl sulfide dianhydride, 1,4-bis(3,4-dicarboxyphenoxy)benzene dianhydride, bis[4-(3,4-dicarboxyphenoxy)phenyl]ether dianhydride, 2,2-bis(3,4-dicarboxyphenyl)hexafluoropropane dianhydride, substituted and unsubstituted pyromellitic dianhydrides, and mixtures of the foregoing dianhydrides. In various embodiments, the polyetherimides comprise structural units derived from at least two dianhydrides described hereinabove. When at least two dianhydrides are selected, the relative amount of any two can be varied over a wide range, for example from a mole ratio of about 1:9 to about 9:1 in one embodiment, and from about 3:7 to about 7:3 in another embodiment.

In various embodiments at least one chain stopper may be employed in the synthesis of polyetherimides of the present invention. Generally, the chain stopper comprises at least one of a mono-anhydride or a mono-amine. The mono-anhydride can be an aliphatic or an aromatic anhydride. Likewise, the mono-amine can be an aliphatic or an aromatic amine. In some embodiments the chain stopper comprises one or more of a substituted or unsubstituted phthalic anhydride, illustrative examples of which include, halogenated, chlorinated, brominated and nitrated phthalic anhydrides; or a substituted or unsubstituted aniline, illustrative examples of which include alkylated anilines. In a particular embodiment, the chain stopper comprises at least one of tert-butylaniline or phthalic anhydride since these are readily available materials. The chain stopper may be used in an amount of from about 1 mole percent to about 10 mole percent in one embodiment, and from about 2 mole percent to about 10 mole percent in another embodiment, based on total moles of dianhydride and diamine used in the reaction.

An alternative method for preparing the polyetherimides of the invention comprising structural units of formula (II) involves reaction of an alkali metal salt of a dihydroxy-substituted aromatic hydrocarbon with a bis(imide) of the formula (XV):

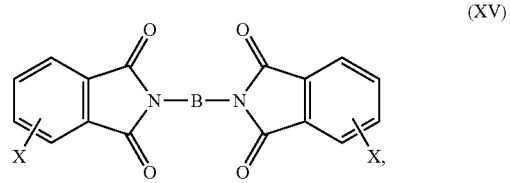

(XV)

where X is selected from leaving groups, such as nitro, chloro, and bromo. This method of preparing polyetherimides is often performed in the presence of a phase transfer catalyst, which functions as the polymerization catalyst. Bis(imides) of formula (XV) may be prepared by reaction of diamines of formula $B(NH_2)_2$ with a phthalic anhydride of the formula (XVI):

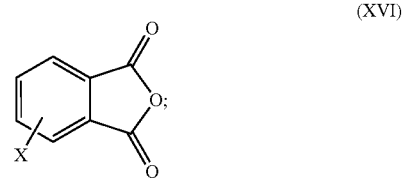

(XVI)

where X is as previously defined; generally in a solvent. The reaction is generally carried out with about 1 mole of diamine and about 2 moles of the anhydride (XVI). The phase transfer catalyst employed is preferably one that is substantially stable at temperatures in the range of about 180° C. to about 250° C. Various types of polymerization catalysts may be used for this purpose. In an embodiment, the polymerization catalyst comprises hexaalkyl guanidinium salts, Group IA metal carboxylic acid salts, or Group IIB metal carboxylic acid salts. Hexaalkyl guanidinium salts, such as those disclosed in U.S. Pat. Nos. 6,235,934 and 5,872,294 are preferred polymerization catalysts since they are stable at the high reaction temperatures generally employed for forming the polyetherimides. Metal salts of dihydroxy-substituted aromatic hydrocarbons that can be used in this method include the alkali metal salts, such as the sodium and potassium salts. Sodium salts are frequently preferred due to their availability and relatively low cost. In an embodiment, alkali metal salts of bisphenol A are preferred materials for producing the polyetherimides using this method. It is frequently advantageous to employ a hydrate of the dihydroxy-substituted aromatic hydrocarbon salt, e.g., bisphenol A disodium salt hexahydrate, and dehydrate the hydrate prior to forming the polyetherimide.

Suitable solvents that can be used include, but are not limited to, ortho-dichlorobenzene, para-dichlorobenzene, meta-dichlorobenzene, mixtures of the isomeric dichlorobenzenes; 1,2,4-trichlorobenzene, 1,2,3-trichlorobenzene, mixtures of the isomeric trichlorobenzenes, 1,1,1,3,3,3-hexafluoroisopropanol, N-methylpyrrolidinone, N-cyclohexylpyrrolidinone, bis(2-methoxyethyl)ether, N,N-dimethylformamide, N,N-dimethylacetamide, chloroform, sulfolane, meta-cresol, veratrole, anisole, and mixtures of the foregoing solvents. The polyetherimide thus produced in solution can be isolated using techniques known in the art, such as for example the method disclosed in U.S. Pat. No. 4,603,194.

Another alternative method for producing the polyetherimides is by melt polymerization. In illustrative examples the dianhydrides, 2,2-bis[4-(3,4-dicarboxyphenoxy)phenyl] propane dianhydride, the mixed dianhydride 2-[4-(3,4-dicarboxyphenoxy)phenyl]-2-[4-(2,3-dicarboxyphenoxy)phenyl]propane dianhydride, 2,2-bis[4-(2,3-dicarboxyphenoxy)phenyl]propane dianhydride, pyromellitic dianhydride, or 3,3',4,4'-oxydiphthalic anhydride, or mixtures thereof are reacted with the benzimidazole diamines of formula (XIV), and second diamines of formula $B(NH_2)_2$, by heating at elevated temperatures with concurrent intermixing. Generally, melt polymerization temperatures between about 200° C. to about 400° C. are employed. Chain stoppers useful in the reaction are those known in the art. Any order of addition of chain stoppers ordinarily employed in melt polymerization can be employed. The conditions of the reaction and the proportions of ingredients can be varied widely depending on the desired properties of the polyetherimide, such as molecular weight, intrinsic viscosity, mechanical strength, and solvent resistance.

The techniques described above are advantageously applied for preparing a polyetherimide composition by reacting a dianhydride composition comprising 2,2'-isopropylidene-bis(4-phenyleneoxy-4-phthalic acid)dianhydride with a diamine composition comprising 2-(4-aminophenyl)-5(6)-aminobenzimidazole and meta-phenylenediamine, for example in a suitable solvent. Solvents that can be used for this reaction include those described hereinabove. In an embodiment, these reactions are carried out by employing mole ratios of 2-(4-aminophenyl)-5(6)-aminobenzimidazole to meta-phenylenediamine in a range of between about 10:1 to about 1:10. Any of the techniques referred to above for isolating the polyetherimides can be applied to this preparation as well.

The polyetherimide compositions prepared using 2-(4-aminophenyl)-5(6)-aminobenzimidazole, meta-phenylene diamine, and BPADA are generally yellow materials. The yellowness of the polyetherimide generally decreases as the content of structural units derived from 2-(4-aminophenyl)-5(6)-aminobenzimidazole increases. The polymers may be soluble in solvents, such as hexafluoroisopropanol, N-methylpyrrolidinone, N,N-dimethylformamide, chloroform, and mixtures of chloroform with hexafluoroisopropanol. Solubility of the polymers in chloroform typically increases with decreasing content of structural units derived from 2-(4-aminophenyl)-5(6)-aminobenzimidazole. The polymers are generally insoluble in methanol and toluene.

The polyetherimides disclosed herein form melt-pressed films that are transparent and tough. Solvent-cast films can also be prepared using techniques known to those skilled in the art. Furthermore, the polyetherimides of the invention have high glass transition temperatures, generally above about 230° C., and often above about 240° C. For a given aromatic diamine comonomer, the glass transition temperature of the polyetherimide generally increases as the content of the structural units derived from 2-(4-aminophenyl)-5(6)-aminobenzimidazole increases. Polyetherimide copolymers, such as those prepared using BPADA and a 50:50 mole ratio of 2-(4-aminophenyl)-5(6)-aminobenzimidazole and meta-phenylene diamine are stable up to about 560° C. in nitrogen with more than about 50 percent char formation at about 800° C. The polyetherimides disclosed herein also have the potential for exhibiting superior adhesion and mechanical properties. By a proper selection of the benzimidazole diamine, the aromatic diamine, and the dianhydride building blocks, it is possible to produce a variety of polyetherimides having a diverse range of useful properties.

EXAMPLES

Glass transition temperature (denoted as "$T_g$") corresponds to the inflection point in the second differential scanning calorimetry heating trace obtained by employing a heating rate of 20° C. per minute under nitrogen. $T_g$ values in parentheses were obtained using a dynamic mechanical analyzer. Decomposition onset temperature (denoted as "$T_{dec}$") was measured by thermogravimetric analysis by employing a heating rate of 20° C. per minute under air or nitrogen. The $T_{dec}$ corresponds to the temperature at which the polyetherimide starts to decompose. The degree of polymerization (denoted as "DP") of tert-butylaniline end-capped polyetherimide was calculated by proton NMR spectroscopy by measuring the area under the integral curves for the bisphenol A methyl protons and the tert-butylaniline methyl protons.

Example 1

This Example describes a representative procedure for preparing polyetherimide copolymers using N-methylpyrrolidinone (also sometimes called "NMP") as the solvent. The starting monomers comprised BPADA and a 1:1 molar mixture of meta-phenylene diamine (also referred to as "MDA") and ABIZ. Anhydrous NMP used for the reactions was stored over molecular sieves.

To a 250 milliliter three-necked, round-bottomed flask equipped with a Dean-Stark condenser and overhead mechanical stirrer were charged MDA (1.2 grams, 11.2 millimoles), ABIZ (2.5 grams, 11.85 millimoles), para-tert-butylaniline (0.17 grams, 1.14 millimoles, 5 mole percent relative to total moles of MDA and ABIZ), and 50 milliliters of N-methylpyrrolidinone. To the resulting mixture with stirring was added BPADA (11.94 grams, 22.94 millimoles). A further 10 milliliters of NMP was used to wash all of the BPADA into the reaction flask. Upon BPADA addition, most of the solids in the reaction mixture dissolved forming a honey-colored, viscous solution. This was stirred overnight at room temperature. The polymerization mixture was then stirred at about 70° C. for about 20 minutes, and then treated with 20 milliliters of toluene. The resulting mixture was heated to reflux using an oil bath maintained at about 180° C. to remove water as an azeotrope over a period of about 3 hours. When about 1 milliliter of water was distilled off, the reaction mixture was cooled to room temperature and poured into a large excess of methanol. The polymer was further reprecipitated by first dissolving it in a 70:30 volume ratio of chloroform and hexafluoroisopropanol, respectively, and then pouring it into an excess of methanol to yield the desired polymer product.

Examples 2–6

The procedures described above were repeated by using BPADA as the dianhydride monomer; and changing the nature and mole percent amount of the chain stopper, the relative mole ratios of ABIZ and MDA, and the solvent. In Table 1, the abbreviations "tBA", "PA", "ODCB", and "NA" refer to tert-butylaniline, phthalic anhydride, ortho-dichlorobenzene, and "not available", respectively.

TABLE 1

| Example Number | ABIZ/MDA relative mole ratio | Chain stopper (mole percent) | Solvent | $T_g$ (° C.) | $T_{dec}$ (° C.) Nitrogen | Air | DP |
|---|---|---|---|---|---|---|---|
| 1 | 50/50 | tBA (5) | NMP | 249 | 562 | 551 | 12.4 |
| 2 | 50/50 | tBA (4) | ODCB | 258 | 564 | 610 | 22.2 |

TABLE 1-continued

| Example Number | ABIZ/MDA relative mole ratio | Chain stopper (mole percent) | Solvent | $T_g$ (° C.) | $T_{dec}$ (° C.) Nitrogen | Air | DP |
|---|---|---|---|---|---|---|---|
| 3 | 75/25 | tBA (3) | NMP | 277 | 559 | 595 | 24.3 |
| 4 | 50/50 | PA (5) | NMP | 240 | 558 | 558 | NA |
| 5 | 40/60 | tBA (3) | NMP | 247 | 560 | 588 | 28.5 |
| 6 | 25/75 | tBA (3) | NMP | 239 | 561 | 588 | 26.6 |

Example 7

A polyetherimide is prepared as described in Example 1 except that the dianhydride composition consists essentially of a 1:1 mole/mole ratio of BPADA and 2,3,2',3'-biphenyltetracarboxylic acid dianhydride, and phthalic anhydride is added as a chain stopper. The desired copolymer is isolated by precipitation into an anti-solvent.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A polyetherimide composition comprising structural units of the formula:

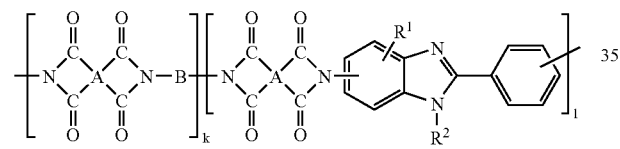

derived from at least one benzimidazole diamine, wherein $R^1$ and $R^2$ are independently selected from hydrogen and $C_1$–$C_6$ alkyl groups;

"A" comprises structural units of the formulae:

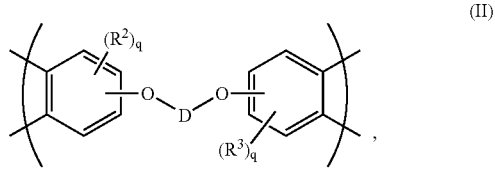

wherein "D" is a divalent aromatic group, $R^3$ is independently selected from hydrogen, halogen, and $C_1$–$C_6$ alkyl groups; "q" is an integer having a value of 1 up to the number of positions available on the aromatic ring for substitution; and "k" and "l" are integers independently having values greater than 1; and "B" comprises substituted and unsubstituted arylene groups having from about 6 to about 25 carbon atoms.

2. The polyetherimide composition of claim 1, comprising structural units derived from 2-(4-aminophenyl)-5(6)-aminobenzimidazole.

3. The polyetherimide composition of claim 1, wherein "D" has the formula:

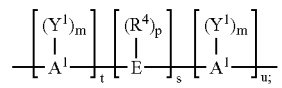

wherein $A^1$ is an aromatic group, E is an alkylene, an alkylidene, a cycloaliphatic group; a sulfur-containing linkage, a phosphorus-containing linkage; an ether linkage, a carbonyl group, a tertiary nitrogen group, or a silicon-containing linkage; $Y^1$ is selected from the group consisting of a hydrogen, a monovalent hydrocarbon group, alkenyl, allyl, halogen, bromine, chlorine; and nitro; wherein "m" represents any integer from and including zero through the number of positions on $A^1$ available for substitution; $R^4$ is a hydrogen or a monovalent hydrocarbon group, wherein "p" represents an integer from and including zero through the number of positions on E available for substitution; "t" represents an integer equal to at least one; "s" represents an integer equal to either zero or one; and "u" represents any integer including zero.

4. The polyetherimide composition of claim 3, wherein "E" is a moiety selected from the group consisting of cyclopentylidene, cyclohexylidene, 3,3,5-trimethylcyclohexylidene, methylcyclohexylidene, neopentylidene, cyclododecylidene, adamantylidene, isopropylidene, bicyclo[2.2.1]hept-2-ylidene, 1,7,7-trimethylbicyclo[2.2.1]hept-2-ylidene, C=$CZ_2$, wherein each Z is hydrogen, chlorine, or bromine, subject to the provision that at least one Z is chlorine or bromine; and mixtures of the foregoing moieties.

5. The polyetherimide composition of claim 1, wherein "B" is selected from the group consisting of substituted and unsubstituted phenylene groups.

6. The polyetherimide composition of claim 5, wherein "B" comprises structural units derived from a diamine, wherein the mole ratio of said diamine to said benzimidazole diamine is in a range of between about 1:10 to about 10:1.

7. The polyetherimide composition of claim 1, wherein "B" is derived from at least one diamine selected from the group consisting of meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, 2,6-bis(mercaptomethyl)-4-methyl-1,3-phenylenediamine, 4,6-bis(mercaptomethyl)-2-methyl-1,3-phenylene diamine, bis(2-chloro-4-amino-3,5-diethylphenyl)methane, 4,4'-oxydianiline, 3,4'-oxydianiline, 3,3'-oxydianiline, 1,2-bis(4-aminoanilino) cyclobutene-3,4-dione, 1,3-bis(3-aminophenoxy)benzene, 1,3-bis(4-aminophenoxy)benzene, 1,4-bis(4-aminophenoxy)benzene), 3,3'-diaminodiphenylsulfone, 4,4'-diaminodiphenylsulfone, bis(4-(4-aminophenoxy)phenyl)sulfone, bis(4-(3-aminophenoxy)phenyl)sulfone, 4,4'-bis(3-aminophenoxy)biphenyl, 4,4'-bis(4-aminophenoxy)biphenyl, 2,2'-bis(4-(4-aminophenoxy)phenyl)propane, 2,2-bis(4-aminophenoxy)biphenyl, 2,2'-bis(4-(4-bis(aminophenyl)hexafluoropropane, 3,3'-diaminobenzophenone, 4,4'-diaminodiphenylmethane, 4,4'-diaminodiphenyl ether, 3,3'-diaminodiphenylmethane, benzidine, 3,3'-dimethylbenzidine, 3,3'-dimethoxybenzidine, 4,4'-diaminodiphenylsulfide, 2,2'-bis(4-aminophenyl)propane, and mixtures of the foregoing diamines.

8. The polyetherimide composition of claim 1, wherein "A" is selected from the group consisting of:

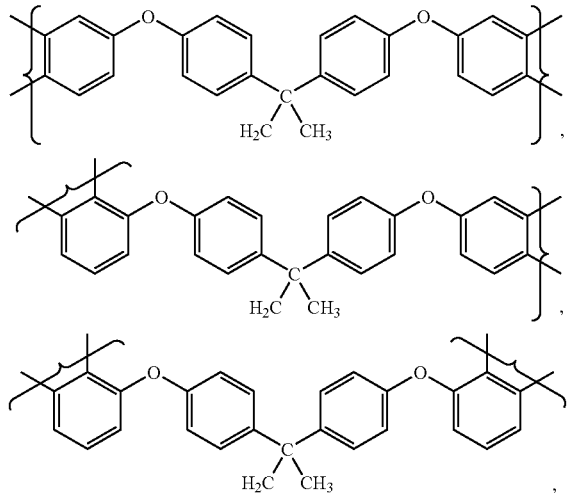

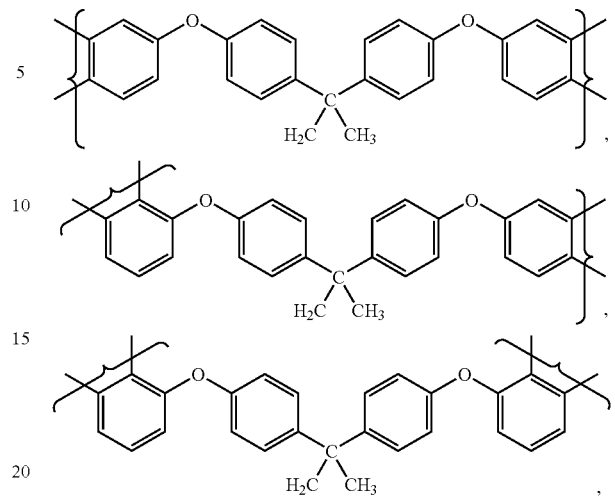

or mixtures of the foregoing structural units;
wherein and "k" and "l" are integers independently having a value of greater than 1;
"B" comprises substituted and unsubstituted arylene groups having from about 6 to about 25 carbon atoms.

17. The polyetherimide composition of claim 16, comprising structural units derived from 2-(4-aminophenyl)-5(6)-aminobenzimidazole.

18. The polyetherimide composition of claim 16, wherein "A" comprises structural units derived from at least two dianhydrides.

19. The polyetherimide composition of claim 18, wherein the mole ratio of two dianhydrides is in a range of between about 1:9 to about 9:1.

20. The polyetherimide composition of claim 16, wherein "B" is derived from a diamine selected from the group consisting of meta-phenylene diamine, para-phenylene phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, bis(2-chloro-4-amino-3,5-diethylphenyl)methane, 4,4'-oxydianiline, 3,4'-oxydianiline, 3,3'-oxydianiline, 4,4'-diaminodiphenylsulfone, 3,3'-diaminodiphenylsulfone, and mixtures of the foregoing diamines.

and mixtures thereof.

9. The polyetherimide composition of claim 1, wherein "A" comprises structural units derived from at least two dianhydrides.

10. The polyetherimide composition of claim 9, wherein the mole ratio of two dianhydrides is in a range of between about 1:9 to about 9:1.

11. The polyetherimide composition of claim 1, wherein "k" and "l" are integers independently having values from 1 to about 50.

12. The polyetherimide composition of claim 1, wherein said polyetherimide is a block or a random copolymer.

13. The polyetherimide composition of claim 1, wherein said polyetherimide is a random copolymer.

14. The polyetherimide composition of claim 1, further comprising structural units derived from at least one chain stopper selected from the group consisting of mono-anhydride and mono-amines.

15. The polyetherimide composition of claim 1, having a glass transition temperature of greater than about 230° C.

16. A polyetherimide composition comprising structural units of the formula:

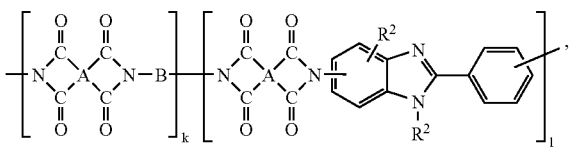

derived from at least one benzimidazole diamine, wherein $R^1$ and $R^2$ are independently selected from hydrogen and $C_1$–$C_6$ alkyl groups; "A" comprises structural units of the formulae:

21. The polyetherimide composition of claim 20, wherein the mole ratio of said diamine to said benzimidazole diamine is in a range of between about 1:10 to about 10:1.

22. The polyetherimide composition of claim 16, wherein "k" and "l" are integers independently having values from about 1 to about 50.

23. The polyetherimide composition of claim 16, wherein said polyetherimide is a block or a random copolymer.

24. The polyetherimide composition of claim 16, wherein said polyetherimide is a random copolymer.

25. The polyetherimide composition of claim 16, further comprising structural units derived from at least one chain stopper selected from the group consisting of aliphatic mono-anhydrides, aromatic mono-anhydrides, phthalic anhydride, substituted phthalic anhydrides, aliphatic mono-amines, aromatic mono-amines, aniline, alkylated anilines and t-butyl aniline.

26. A polyetherimide composition comprising structural units of the formula:

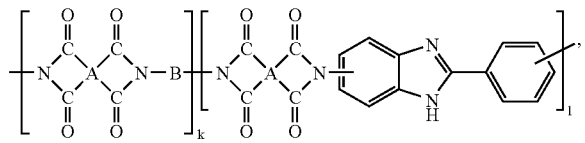

derived from 2-(4-aminophenyl)-5(6)-aminobenzimidazole; wherein "A" comprises structural units of the formulae:

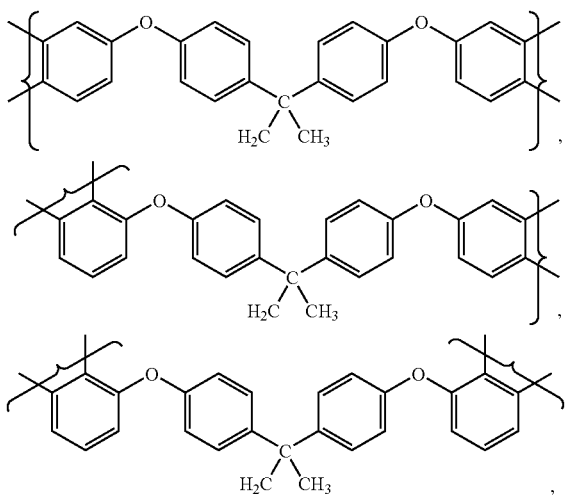

or mixtures of the foregoing structural units;
wherein "k" and "l" are integers independently having a value of greater than 1;
"B" is an arylene group derived from at least one second diamine selected from the group consisting of 1,3-phenylene diamine, 1,4-phenylene diamine, 2,6-diethyl-4-methyl-1,3-phenylene diamine, 4,6-diethyl-2-methyl-1,3-phenylene diamine, 4-methyl-1,3-phenylene diamine, methylene bis(2-chloro-3,5-diethyl-4-phenylene) diamine, 2-methyl-1,3-phenylene diamine, 4,4'-oxydianiline, 3,4'-oxydianiline, 3,3'-oxydianiline, 4,4'-diaminodiphenylsulfone, 3,3'-diaminodiphenylsulfone, and mixtures of the foregoing diamines.

27. The polyetherimide composition of claim 26, wherein the mole ratio of said second diamine and 2-(4-aminophenyl)-5(6)-aminobenzimidazole is in a range of between about 10:1 to about 1:10.

28. The polyetherimide composition of claim 26, wherein "k" and "l" are integers independently having values from 1 to about 50.

29. The polyetherimide composition of claim 26, wherein said polyetherimide is a block or a random copolymer.

30. The polyetherimide composition of claim 26, wherein said polyetherimide is a random copolymer.

31. The polyetherimide composition of claim 26, further comprising structural units derived from at least one chain stopper selected from the group consisting of aliphatic mono-anhydrides, aromatic mono-anhydrides, phthalic anhydride, substituted phthalic anhydrides, aliphatic mono-amines, aromatic mono-amines, aniline, alkylated anilines and t-butyl aniline.

32. A polyetherimide composition consisting essentially of structural units of the formula:

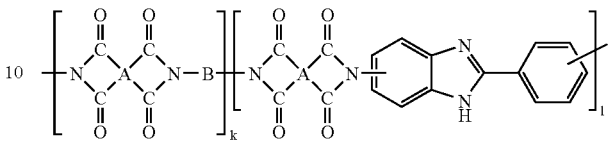

derived from 2-(4-aminophenyl)-5(6)-aminobenzimidazole; wherein "A" consists essentially of structural units of the formulae:

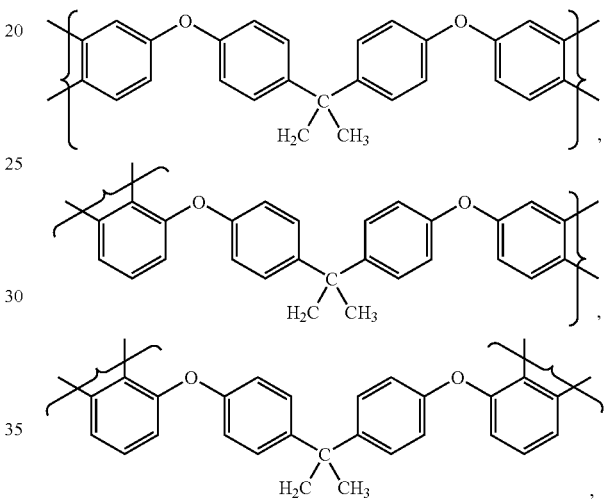

or mixtures of the foregoing structural units;
wherein "k" and "l" are integers independently having a value of greater than 1; and
"B" is an arylene group derived from at least one second diamine selected from the group consisting of 1,3-phenylene diamine, 1,4-phenylene diamine, 2,6-diethyl-4-methyl-1,3-phenylene diamine, 4,6-diethyl-2-methyl-1,3-phenylene diamine, 4-methyl-1,3-phenylene diamine, methylene bis(2-chloro-3,5-diethyl-4-phenylene) diamine, 2-methyl-1,3-phenylene diamine, 4,4'-oxydianiline, 3,4'-oxydianiline, 3,3'-oxydianiline, 4,4'-diaminodiphenylsulfone, 3,3'-diaminodiphenylsulfone, and mixtures of the foregoing diamines.

33. The polyetherimide composition of claim 32, wherein the mole ratio of said second diamine and 2-(4-aminophenyl)-5(6)-aminobenzimidazole is in a range of between about 10:1 to about 1:10.

34. The polyetherimide composition of claim 32, wherein "k" and "l" are integers independently having values from 1 to about 50.

35. The polyetherimide composition of claim 32, wherein said polyetherimide is a block or a random copolymer.

36. The polyetherimide composition of claim 30, wherein said polyetherimide is a random copolymer.

37. The polyetherimide composition of claim 32, further comprising structural units derived from at least one chain stopper selected from the group consisting of aliphatic mono-anhydrides, aromatic mono-anhydrides, phthalic anhydride, substituted phthalic anhydrides, aliphatic mono-amines, aromatic mono-amines, aniline, alkylated anilines and t-butyl aniline.

38. A method of producing a polyetherimide composition, said method comprising:
reacting a dianhydride composition with a first diamine composition comprising a benzimidazole diamine and a second diamine in a solvent to form a poly(amic acid), and
imidizing said poly(amic acid) to form said polyetherimide composition,
wherein said polyetherimide composition comprises structural units of the formula:

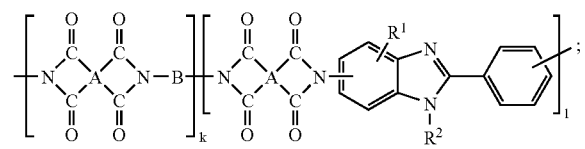

wherein $R^1$ and $R^2$ are independently selected from hydrogen, and $C_1$–$C_6$ alkyl groups;
"A" comprises structural units of the formulae:

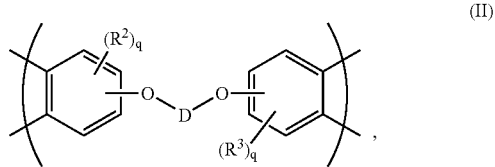

wherein "D" is a divalent aromatic group, $R^3$ is selected from hydrogen, halogen, and $C_1$–$C_6$ alkyl groups; "q" is an integer having a value of 1 up to the number of positions available on the aromatic ring for substitution; k" and "l" are integers independently having a value greater than 1;
"B" comprises substituted and unsubstituted arylene groups having from about 6 to about 25 carbon atoms.

39. The method of claim 38, wherein said first diamine comprises 2-(4-aminophenyl)-5(6)-aminobenzimidazole.

40. The method of claim 38, wherein "B" is selected from the group consisting of substituted and unsubstituted phenylene groups.

41. The method of claim 38, wherein the mole ratio of said second diamine to said benzimidazole diamine is in a range of between about 1:10 to about 10:1.

42. The method of claim 38, wherein said second diamine comprises at least one diamine selected from the group consisting of meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, 2,6-bis(mercaptomethyl)-4-methyl-1,3-phenylenediamine, 4,6-bis(mercaptomethyl)-2-methyl-1,3-phenylene diamine, bis(2-chloro-4-amino-3,5-diethylphenyl)methane, 4,4'-oxydianiline, 3,4'-oxydianiline, 3,3'-oxydianiline, 1,2-bis(4-aminoanilino)cyclobutene-3,4-dione, 1,3-bis(3'-aminophenoxy)benzene, 1,3-bis(4-aminophenoxy)benzene, 1,4-bis(4-aminophenoxy)benzene, 3,3'-diaminophenylsulfone, 4,4'-diaminophenylsulfone, bis(4-(4-aminophenoxy)phenyl)sulfone, bis(4-(3-aminophenoxy)phenyl)sulfone, 4,4'-bis(3-aminophenoxy)biphenyl, 4,4'-bis(4-aminophenoxy)biphenyl, 2,2'-bis(4-(4-aminophenoxy)phenyl)propane, 2,2-bis[4-(4-aminophenoxy)phenyl]hexafluoropropane, 4,4'-diaminodiphenylmethane, 4,4'-diaminophenyl ether, 3,3'-diaminodiphenylmethane, benzidine, 3,3'-dimethylbenzidine, 3,3'-dimethoxybenzidine, 4,4'-diaminodiphenylsulfide, 2,2'-bis(4-aminophenyl)propane, and mixtures of the foregoing diamines.

43. The method of claim 38, wherein "A" comprises structural units derived from 2,2-bis[4-(3,4-dicarboxyphenoxy)phenyl]propane dianhydride; or 2,2-bis[4-(2,3-dicarboxyphenoxy)phenyl]propane dianhydride.

44. The method of claim 38, wherein "A" comprises structural units derived from at least two dianhydrides.

45. The polyetherimide composition of claim 44, wherein the mole ratio of two dianhydrides is in a range of between about 1:9 to about 9:1.

46. The method of claim 38, wherein said solvent is at least one selected from the group consisting of ortho-dichlorobenzene, para-dichlorobenzene, meta-dichlorobenzene, mixtures of the isomeric dichlorobenzene, para-dichlorobenzene, meta-trichlorobenzene, mixtures of the isomeric trichlorobenzenes, 1,1,1,3,3,3-hexafluoroisopropanol, N-methylpyrrolidinone, N-cyclohexylpyrrolidone, bis(2-methoxyethyl)ether, N,N-dimethylformamide, N,N-dimethylacetamide, chloroform, sulfolane, meta-cresol, veratrole, anisole, and mixtures of the foregoing solvents.

47. The method of claim 38, wherein said method further comprises adding at least one chain stopper.

48. The method of claim 47, wherein said chain-stopper comprises at least one of a mono-anhydride or a mono-amine.

49. The method of claim 47, wherein said chain-stopper is selected from the group consisting of aliphatic mono-anhydrides, aromatic mono-anhydrides, phthalic anhydride, substituted phthalic anhydrides, aliphatic mono-amines, aromatic mono-amines, aniline, alkylated anilines and t-butyl aniline.

50. The method of claim 47, wherein said chain-stopper is used in an amount from about 1 mole percent to about 10 mole percent based on a total moles of said dianhydride composition and said diamine composition.

51. The method of claim 47, wherein said chain-stopper is used in an amount from about 2 mole percent to about 10 mole percent based on total moles of said dianhydride composition and said diamine composition.

52. The method of claim 38, wherein said polyetherimide composition is isolated.

53. The method of claim 38, wherein said method further comprises use of a polymerization catalyst.

54. The method of claim 53, wherein said catalyst comprises hexaalkyl guanidinium salts, Group IA metal carboxylic acid salts, or Group IIB metal carboxylic acid salts.

55. A method of producing a polyetherimide composition, said method comprising:
reacting a dianhydride composition comprising 2,2'-isopropylidene-bis-(4-phenyleneoxy-4-phthalic acid)dianhydride with a diamine composition comprising 2-(4-aminophenyl)-5(6)-aminobenzimidazole and meta-phenylenediamine in a solvent to form a poly (amic acid),
adding a chain-stopper comprising aliphatic mono-anhydrides, aromatic mono-anhydrides, phthalic anhydride, substituted phthalic anhydrides, aliphatic mono-amines, aromatic mono-amines, aniline, alkylated anilines or t-butyl aniline; and
imidizing said poly(amic acid) to form said polyetherimide composition.

56. The method of claim 55, wherein the mole ratio of amount of 2-(4-aminophenyl)-5(6)-aminobenzimidazole to meta-phenylenediamine is in a range of between about 10:1 to about 1:10.

57. The method of claim 55, wherein said solvent is at least one selected from the group consisting of ortho-dichlorobenzene, para-dichlorobenzene, meta-dichlorobenzene, mixtures of isomeric dichlorobenzenes: 1,2,4-trichlorobenzene, 1,2,3-trichlorobenzene, mixtures of isomeric trichlorobenzenes, 1,1,3,3,3-hexafluoroisopropanol, N-methylpyrrolidinone, N-cyclohexylpyrrolidone, bis(2-methoxyethyl)ether, N,N-dimethylformamide, N,N-dimethylacetamide, chloroform, sulfolane, meta-cresol, veratrole, anisole, and mixtures of the foregoing solvents.

58. The method of claim 55, wherein said polyetherimide composition is isolated.

59. An article comprising the polyetherimide composition of claim 1.

60. An article comprising the polyetherimide composition prepared in accordance with the method of claim 55.

61. The article of claim 59, wherein said article comprises films or fibers.

62. The article of claim 60, wherein said article comprises films or fibers.

* * * * *